(12) United States Patent
Sakurai

(10) Patent No.: US 11,209,687 B2
(45) Date of Patent: Dec. 28, 2021

(54) SPATIAL PHASE MODULATOR

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 0 days.

(21) Appl. No.: 16/728,670

(22) Filed: Dec. 27, 2019

(65) Prior Publication Data

US 2020/0209675 A1    Jul. 2, 2020

(30) Foreign Application Priority Data

Dec. 28, 2018 (JP) .............................. JP2018-248163

(51) Int. Cl.
| | | |
|---|---|---|
| G02F 1/1333 | (2006.01) | |
| G02F 1/1335 | (2006.01) | |
| G02F 1/1337 | (2006.01) | |
| G02F 1/1362 | (2006.01) | |
| G02F 1/1343 | (2006.01) | |

(52) U.S. Cl.
CPC ...... *G02F 1/133385* (2013.01); *G02F 1/1337* (2013.01); *G02F 1/133308* (2013.01); *G02F 1/133553* (2013.01); *G02F 1/13439* (2013.01); *G02F 1/133302* (2021.01); *G02F 1/133331* (2021.01); *G02F 1/136277* (2013.01); *G02F 2203/50* (2013.01)

(58) Field of Classification Search
CPC .......... G02F 1/133385; G02F 2203/12; G02F 1/133552; G02F 1/1337; G02F 1/136277
See application file for complete search history.

(56) References Cited

U.S. PATENT DOCUMENTS

| | | | | |
|---|---|---|---|---|
| 2007/0258051 A1* | 11/2007 | Kitabayashi | ......... | G03B 21/145 353/31 |
| 2016/0178965 A1* | 6/2016 | Takayama | ............ | G02B 3/0056 359/626 |
| 2018/0348581 A1* | 12/2018 | Abe | .................... | H01L 27/1262 |

FOREIGN PATENT DOCUMENTS

| | | |
|---|---|---|
| JP | H05313157 A | 11/1993 |
| JP | 200044953 A | 2/2000 |
| JP | 2002107766 A | 4/2002 |
| JP | 2003183193 A | 7/2003 |
| JP | 2018085500 A | 5/2018 |

OTHER PUBLICATIONS

Notice of Reason for Refusal issued in corresponding Japanese Patent Application No. 2018-248163, dated Apr. 9, 2019, with translation (12 pages).

(Continued)

*Primary Examiner* — Jessica M Merlin
(74) *Attorney, Agent, or Firm* — Osha Bergman Watanabe & Burton LLP

(57) ABSTRACT

A liquid-crystal spatial phase modulator includes: a liquid-crystal layer; a transparent electrode layer above the liquid-crystal layer; a lower electrode layer disposed below the liquid-crystal layer; a first heat-resistant layer that has higher thermal resistance than the transparent electrode layer and is disposed above and adjacent to the transparent electrode layer; and a second heat-resistant layer that has higher thermal resistance than the transparent electrode layer and is disposed between the transparent electrode layer and the liquid-crystal layer and adjacent to the transparent electrode layer. Light from above passes through the transparent electrode layer.

12 Claims, 4 Drawing Sheets

(56) References Cited

OTHER PUBLICATIONS

Office Action issued in corresponding Japanese Patent Application No. 2018-248163, dated Aug. 6, 2019, with translation (14 pages).
Sakurai, Yasuki. "Laser Processing Technology Using LCOS Technology". Liquid Crystal Japan; The Liquid Crystal Society of Japan; Apr. 25, 2018; vol. 22, No. 2, pp. 129-133 (8 pages).

* cited by examiner

SPATIAL PHASE MODULATOR

TECHNICAL FIELD

The present disclosure relates to a spatial phase modulator.

BACKGROUND

Liquid crystal on silicon (LCOS) devices, developed for display applications, are already known (for example, see patent literature 1). LCOS devices are beginning to be applied as spatial phase modulators not only in display applications but also in various fields such as optical communication and laser machining.

Now, the present inventors are conceiving of constructing a laser machining system using an LCOS device. Using an LCOS phase-modulated image generated through a computer-generated hologram (CGH) would enable one-shot machining of a machining target face.

However, known LCOS devices may not be used to laser-machining applications, which require high-energy light. Specifically, known LCOS devices are not provided with sufficient durability against heat caused by high-energy light and are easily damaged by heat generation.

PATENT LITERATURE

[Patent Literature 1] JP 2018-085500 A

SUMMARY

Therefore, one or more embodiments of the present invention provide a technique that can suppress thermal damage due to input of high-energy light in a liquid-crystal spatial phase modulator.

According to one or more embodiments of the present invention, a liquid-crystal spatial phase modulator provided with a liquid-crystal layer, an upper electrode layer, and a lower electrode layer is provided. The upper electrode layer is positioned above the liquid-crystal layer. The lower electrode layer is positioned below the liquid-crystal layer.

The upper electrode layer is a transparent electrode layer. The transparent electrode layer is configured such that light from above passes through to the liquid-crystal layer. The spatial phase modulator is provided with first and second heat-resistant layers in a position that is above the transparent electrode layer and adjacent to the transparent electrode layer and a position that is between the transparent electrode layer and the liquid-crystal layer and adjacent to the transparent electrode layer. The first and second heat-resistant layers have higher thermal resistance than the transparent electrode layer.

Because a transparent electrode layer normally has a lower transmittance than its surroundings, when high-energy light is input to a liquid-crystal spatial phase modulator, heat is easily generated in the transparent electrode layer. Moreover, an effect of the heat generation by the transparent electrode layer is higher the closer a component is to the transparent electrode layer.

According to one or more embodiments of the present invention, the first and second heat-resistant layers being adjacent to the transparent electrode layer above and below the transparent electrode layer enables suppressing a possibility of the heat generated in the transparent electrode layer damaging adjacent layers. Therefore, according to one or more embodiments of the present invention, thermal damage due to input of high-energy light can be suppressed in the spatial phase modulator.

According to one or more embodiments of the present invention, to realize higher thermal resistance than the transparent electrode layer, the first and second heat-resistant layers may be constituted of inorganic material layers.

According to one or more embodiments of the present invention, the transparent electrode layer may be an indium tin oxide (ITO) transparent electrode layer. Here, the first and second heat-resistant layers may be configured to have thermal resistance up to a temperature over 600 degrees Celsius.

According to one or more embodiments of the present invention, the first heat-resistant layer positioned above the transparent electrode layer may be a cover glass layer. The cover glass layer is configured such that light from above passes through to the liquid-crystal layer. According to one or more embodiments of the present invention, the cover glass layer may be a glass layer of sapphire or quartz.

A glass layer of sapphire or quartz has superior thermal resistance compared to a cover glass layer made of borosilicate glass. Moreover, sapphire has very high thermal conductivity. A cover glass layer with high thermal conductivity can efficiently diffuse the heat generated in the transparent electrode layer and effectively suppress temperature escalation inside the spatial phase modulator.

According to one or more embodiments of the present invention, the second heat-resistant layer positioned between the transparent electrode layer and the liquid-crystal layer may be an oriented film layer positioned above the liquid-crystal layer. The oriented film layer may be an inorganic oriented film layer of silicon oxide ($SiO_x$). An inorganic oriented film layer of silicon oxide ($SiO_x$), which has higher thermal resistance than a polyimide oriented film layer, is useful for improved thermal resistance of the spatial phase modulator.

According to one or more embodiments of the present invention, the second heat-resistant layer may be a thermal buffer layer provided above the oriented film layer to suppress thermal transmission from the transparent electrode layer to the liquid-crystal layer. The oriented film layer can be provided above the liquid-crystal layer.

Providing a thermal buffer layer between the transparent electrode layer and the oriented film layer can suppress the heat generated by the transparent electrode layer from propagating to the liquid-crystal layer, which has low thermal resistance, and improve the thermal resistance of the spatial phase modulator.

According to one or more embodiments of the present invention, a non-metal reflective layer may be provided above the lower electrode layer. The reflective layer may have a multilayer structure of an inorganic material. Providing a reflective layer above the lower electrode layer can more favorably suppress heat generated by light propagating to the lower electrode layer than providing a reflective layer below the lower electrode layer. Moreover, a multilayer structure of an inorganic material can suppress heat generation due to light absorption and can reflect light.

According to one or more embodiments of the present invention, the liquid-crystal layer may be a liquid-crystal layer that does not include a diphenylacetylene polymer material. A non-diphenylacetylene liquid crystal has low light absorbance over a wide wavelength band, to a shorter wavelength band than a diphenylacetylene liquid crystal. Adopting a liquid-crystal layer with low light absorbance can suppress heat generation due to light absorption.

According to one or more embodiments of the present invention, a cooling structure for cooling the interior may be provided on a surface of the spatial phase modulator. A cooling structure can suppress temperature escalation in the spatial phase modulator.

According to one or more embodiments of the present invention, a liquid-crystal spatial phase modulator provided with a cover glass layer, a transparent electrode layer positioned below the cover glass layer, a first oriented film layer positioned below the transparent electrode layer, a liquid-crystal layer positioned below the first oriented film layer, a second oriented film layer positioned below the liquid-crystal layer, and a lower electrode layer positioned below the second oriented film layer may be provided.

In this spatial phase modulator, the transparent electrode layer may be an indium tin oxide (ITO) transparent electrode layer. The cover glass layer may be a glass layer of sapphire or quartz. The first and second oriented film layers may be inorganic oriented film layers of silicon oxide ($SiO_x$). This structure of the spatial phase modulator can suppress thermal damage accompanying input of high-energy light.

According to one or more embodiments of the present invention, a non-metal reflective layer may be provided between the second oriented film layer and the lower electrode layer. The reflective layer may have a multilayer structure of an inorganic material.

According to one or more embodiments of the present invention, a thermal buffer layer for suppressing thermal transmission from the transparent electrode layer to the liquid-crystal layer may be provided between the transparent electrode layer and the first oriented film layer.

DETAILED DESCRIPTION

Illustrative embodiments of the present invention are described below with reference to the drawings.

A spatial phase modulator 100 according to one or more embodiments is a liquid-crystal spatial phase modulator—specifically, an LCOS spatial phase modulator. This spatial phase modulator 100 is configured particularly for high-energy light. Here, "high-energy light" is light having high power and/or a high frequency.

In laser-machining applications, pulsed light having power with a high peak value is emitted. As such, the spatial phase modulator 100, which is used in a laser machining system 10, needs durability against heat generated by input of pulsed light.

Figure 1:
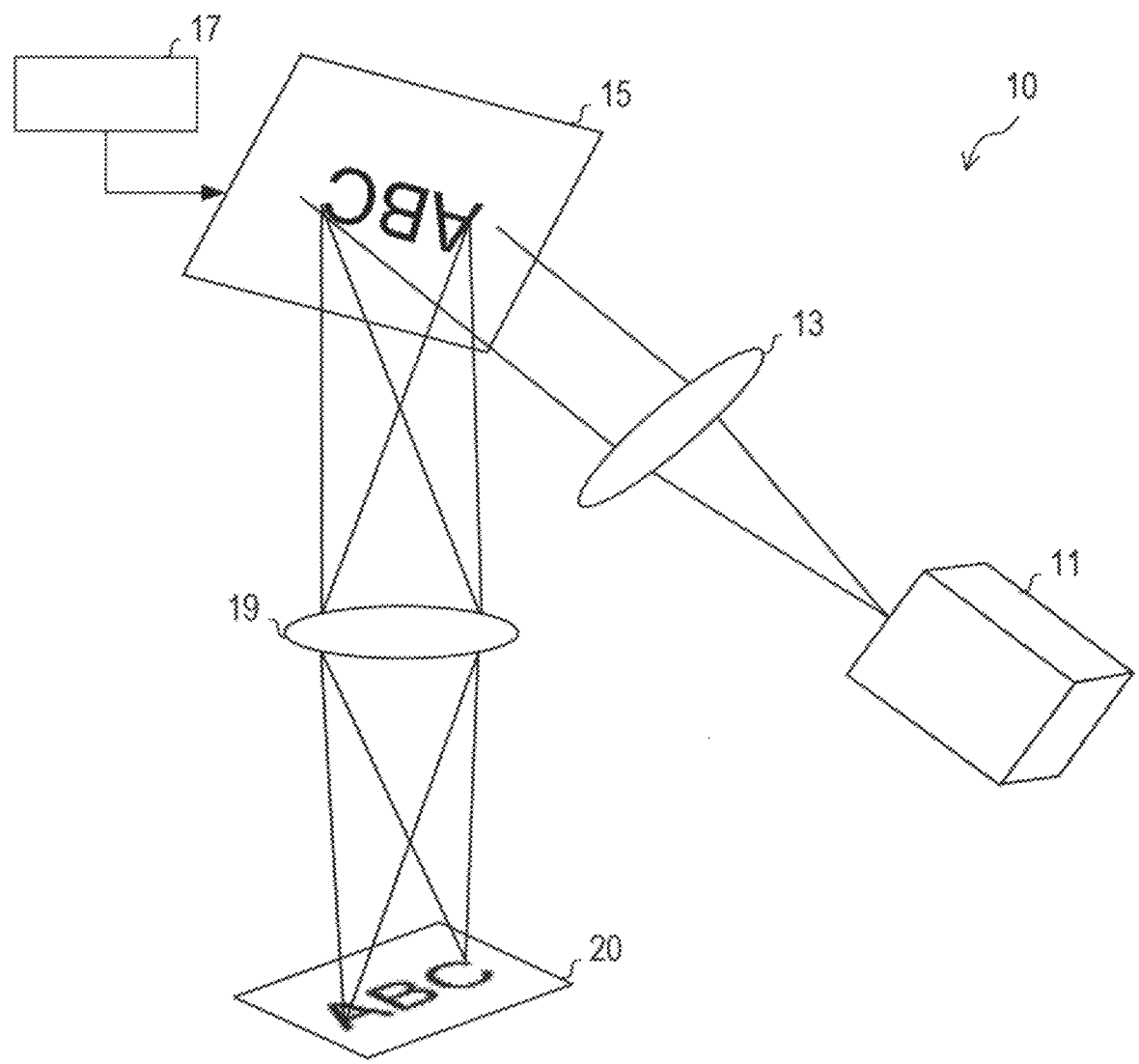
FIG. 1 shows a diagram representing a schematic configuration of a laser machining system.

The laser machining system 10, illustrated in FIG. 1, irradiates pulsed light from a light source 11 to a projection device 15 via a beam magnifying lens 13. The spatial phase modulator 100 according to one or more embodiments is incorporated into the laser machining system 10 as this projection device 15.

The spatial phase modulator 100 has a plurality of two-dimensionally arranged electrodes corresponding to a plurality of pixels and is configured to modulate a phase of input light for each pixel by applying a voltage to the liquid crystal from the plurality of electrodes. The spatial phase modulator 100 is controlled by a controller 17, converting the pulsed light from the light source 11 into phase-modulated light corresponding to an image to be formed on a machining target face 20 and outputting this phase-modulated light.

A phase-modulated image corresponding to the output light from the spatial phase modulator 100 is imaged on the machining target face 20 via an imaging lens 19. The machining target face 20 is machined according to the phase-modulated image generated from this high-power pulsed light. According to this laser machining system 10, a two-dimensional image can be formed on the machining target face 20 by one shot of the pulsed light.

Figure 2:
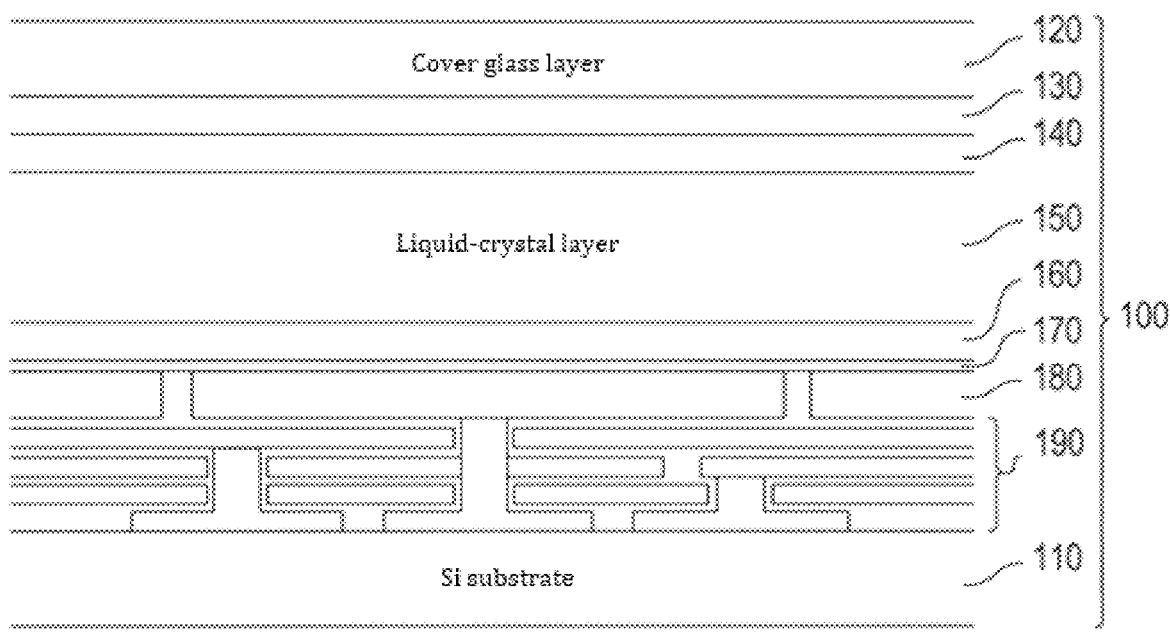
FIG. 2 shows a sectional view representing an internal structure of a spatial phase modulator according to one or more embodiments of the present invention.

The spatial phase modulator 100 according to one or more embodiments, illustrated in FIG. 2, provides a cover glass layer 120, a transparent electrode layer 130, a first oriented film layer 140, a liquid-crystal layer 150, a second oriented film layer 160, a reflective layer 170, a lower electrode layer 180, and a circuit layer 190 on a silicon substrate 110.

The cover glass layer 120 is positioned as the uppermost layer of the spatial phase modulator 100. The pulsed light from the light source 11 is input to the cover glass layer 120. The transparent electrode layer 130 is positioned below the cover glass layer 120. The first oriented film layer 140, the liquid-crystal layer 150, and the second oriented film layer 160 are positioned below the transparent electrode layer 130.

The first oriented film layer 140 is disposed above the liquid-crystal layer 150 and adjacent to the liquid-crystal layer 150. The second oriented film layer 160 is disposed below the liquid-crystal layer 150 and adjacent to the liquid-crystal layer 150.

The reflective layer 170 is positioned below the second oriented film layer 160 and is configured to reflect the pulsed light, which is input to the cover glass layer 120 from above the spatial phase modulator 100 and is propagated through the transparent electrode layer 130, the first oriented film layer 140, the liquid-crystal layer 150, and the second oriented film layer 160 in this order.

The reflected light from the reflective layer 170 corresponding to the light input to the cover glass layer 120 is propagated upward through the second oriented film layer 160, the liquid-crystal layer 150, the first oriented film layer 140, the transparent electrode layer 130, and the cover glass layer 120 in this order and output as phase-modulated light of the input light.

The lower electrode layer 180 is provided with the electrodes for each pixel as above and, together with the transparent electrode layer 130, receives a drive signal from the controller 17 and applies a voltage for each pixel to the liquid-crystal layer 150. This causes the light passing through the liquid-crystal layer 150 to undergo a phase shift for each pixel, and phase modulation is realized thereby.

For improved thermal resistance of the spatial phase modulator 100, the layers of the spatial phase modulator 100 according to one or more embodiments configured in this manner are composed of the materials listed in table 1.

TABLE 1

| Layer | Material | Thermal resistance (° C.) |
|---|---|---|
| Cover glass layer | Sapphire (or quartz) | ~2000 |
| Transparent electrode layer | ITO | ~600 |
| Oriented film layer | SiOx | 1000 |
| Liquid-crystal layer | Liquid crystal | ~400 |
| Oriented film layer | SiOx | 1000 |
| Reflective layer | Inorganic multilayer structure | 1100 |
| Lower electrode layer | Aluminum/gold | 1100 |

Improved thermal resistance is realized particularly by material selection for the cover glass layer 120, the first oriented film layer 140, the second oriented film layer 160, and the reflective layer 170. Actions that can be taken to improve thermal resistance include the following three actions:
(1) Selecting a material having high thermal resistance.
(2) Selecting a material with favorable thermal conductivity to diffuse heat rapidly.
(3) Selecting a material with favorable transmittance to suppress heat generation due to light absorption.

However, material selection is restricted according to an intended function of the spatial phase modulator 100. According to one or more embodiments, an indium tin oxide (ITO) transparent electrode layer is adopted as the transparent electrode layer 130. ITO is a wide-gap semiconductor having an energy band gap in an ultraviolet region.

The carrier density of ITO is considerably lower than that of metal. As such, ITO has optical transparency. However, because ITO cannot avoid absorption via carrier, light absorption of about 20% occurs in a wavelength band of 400 to 1,000 nm.

A wavelength of pulsed light used in laser machining is normally in a range of 400 to 1,000 nm. As such, a transmittance of the transparent electrode layer 130 in the spatial phase modulator 100 applied to laser machining is about 80% at best.

This transmittance of the transparent electrode layer 130 is particularly low among the layers from the cover glass layer 120 to a boundary with the reflective layer 170 of the spatial phase modulator 100, and the transparent electrode layer 130 is a layer that easily generates heat upon receiving the pulsed light. Moreover, the thermal resistance of the transparent electrode layer 130 is about 600° C. or less, and the thermal resistance of the transparent electrode layer 130 is not high.

Meanwhile, according to the intended function of the spatial phase modulator 100, the transparent electrode layer 130 must be transparent and conductive; given these restrictions, it is appropriate to constitute the transparent electrode layer 130 of ITO. As such, according to one or more embodiments, upon adopting an ITO transparent electrode layer as the transparent electrode layer 130, material selection to counteract the heat generation of the transparent electrode layer 130 is performed.

Specifically, according to one or more embodiments, the cover glass layer 120 is constituted of sapphire. The heat resistance of sapphire is about 2,000° C. Moreover, the transmittance of sapphire is about 85% or greater in a wavelength band of 400 to 1,000 nm.

In this manner, a sapphire cover glass layer 120 has higher thermal resistance and transparency than the transparent electrode layer 130. This thermal resistance is higher than borosilicate glass, which is commonly used as the material of the cover glass layer 120. The thermal resistance of borosilicate glass is about 500° C.

Furthermore, the thermal conductivity of sapphire is about 42 W/mK, which is about forty times higher than the thermal conductivity of borosilicate glass. In this manner, a sapphire cover glass layer 120 is not only durable against heat generation from the transparent electrode layer 130 but can also efficiently diffuse and disperse to the outside the heat generated by the transparent electrode layer 130.

That is, a sapphire cover glass layer 120 can more favorably suppress a speed whereat heat accumulates in the spatial phase modulator 100 and, by extension, a speed whereat a temperature rises, compared to when, for example, a borosilicate-glass cover glass layer is adopted. This suppressing action is very useful in reducing a possibility of thermal damage in the spatial phase modulator 100.

Furthermore, according to one or more embodiments, the first and second oriented film layers 140 and 160 are composed not of a polyimide organic oriented film layer that is conventionally often used in the spatial phase modulator 100 but of a silicon oxide ($SiO_x$) inorganic oriented film layer.

The thermal resistance of a polyimide organic oriented film layer is 400° C. or less. Meanwhile, the thermal resistance of a silicon oxide ($SiO_x$) inorganic oriented film layer is higher than the thermal resistance of 600° C. of the transparent electrode layer 130 and is about 1,000° C. Note that the thermal resistance of the liquid-crystal layer 150 is 400° C. or less.

That is, the thermal resistance of the first and second oriented film layers 140 and 160 is higher than the transparent electrode layer 130 and the liquid-crystal layer 150. As such, according to the first and second oriented film layers 140 and 160, the spatial phase modulator 100 becoming unusable due to the first and second oriented film layers 140 and 160 being damaged before the transparent electrode layer 130 and the liquid-crystal layer 150 can be suppressed.

A silicon oxide ($SiO_x$) inorganic oriented film layer has a transmittance sufficiently higher than the transmittance of the transparent electrode layer 130 in a wavelength band of 400 to 1,000 nm. Specifically, a silicon oxide ($SiO_x$) inorganic oriented film layer (first and second oriented film layers 140 and 160) has a transmittance of about 95% or greater. This transmittance is equal to a polyimide organic oriented film layer. As such, it is fundamentally not the case that changing a polyimide organic oriented film layer to a silicon oxide ($SiO_x$) inorganic oriented film layer will increase heat generation in the first and second oriented film layers 140 and 160.

Additionally, according to one or more embodiments, heat generation in the lower electrode layer 180 is suppressed by disposing the reflective layer 170 above the lower electrode layer 180. As configurations of a spatial phase modulator, a configuration of reflecting the input light from the cover glass layer 120 below the lower electrode layer 180 and a configuration of reflecting the input light from the cover glass layer 120 above the lower electrode layer 180 are known; according to one or more embodiments, heat generation is suppressed by adopting the latter configuration.

Furthermore, although in a conventional spatial phase modulator, lower electrodes made of metal are imparted with reflectivity to reflect input light, according to one or more embodiments, the reflective layer 170, which is non-metal, is provided above the lower electrode layer 180, which is made of metal.

Specifically, the reflective layer 170 is configured of a multilayer structure of an inorganic material. Examples of the inorganic material include silicon dioxide ($SiO_2$), titanium oxide ($TiO_2$ or $Ti_2O_3$), and magnesium fluoride $MgF_2$. The thermal resistance of a multilayer structure of these inorganic materials corresponds to a melting point of these inorganic materials and is about 1,100° C.

A multilayer structure of an inorganic material can constitute a reflective layer 170 with a transmittance of less than 1%. This low transmittance can substantially eliminate heat generation due to light absorption in the lower electrode layer 180. The lower electrode layer 180 can be configured to have electrodes of aluminum or gold.

According to the above spatial phase modulator 100 according to one or more embodiments, an inorganic-material cover glass layer 120 and first oriented film layer 140 having higher thermal resistance than the transparent electrode layer 130 are respectively disposed in a position that is above the transparent electrode layer 130 and adjacent to the transparent electrode layer 130 and a position that is between the transparent electrode layer 130 and the liquid-crystal layer 150 and adjacent to the transparent electrode layer 130. This disposition reduces a possibility of thermal damage to layers adjacent to the transparent electrode layer 130, which are easily affected by heat generation from the transparent electrode layer 130. Said further, in the wavelength band of the input light, the cover glass layer 120 and the first and second oriented film layers 160, which have higher transmittances than the transparent electrode layer 130, suppress heat generation due to light absorption in the spatial phase modulator 100.

Furthermore, the cover glass layer 120, which has high thermal conductivity, efficiently diffuses the heat generated in the transparent electrode layer 130 from a location wherethrough the light passes, suppressing temperature escalation in the spatial phase modulator 100. Therefore, according to one or more embodiments, as a spatial phase modulator 100 for a high-energy-light application—particularly a laser-machining application—a spatial phase modulator 100 that is highly durable against heat can be provided.

Furthermore, to improve the durability of the spatial phase modulator 100, it is favorable to adopt a non-diphenylacetylene liquid crystal that does not include a diphenylacetylene polymer material as the material of the liquid-crystal layer 150. Diphenylacetylene polymer materials can be represented by the following chemical formula.

[Chem. 1]

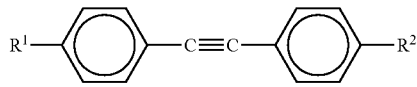

In the spatial phase modulator 100 according to one or more embodiments, the liquid-crystal layer 150, which is the only layer composed of an organic material, has low thermal resistance. As above, the thermal resistance of the liquid-crystal layer 150 is 400° C. or less. Moreover, because the liquid-crystal layer 150 absorbs light to some extent, it generates heat. In view of the low thermal resistance of this liquid-crystal layer 150, light absorption by the liquid-crystal layer 150 may be suppressed as much as possible.

Figure 3:
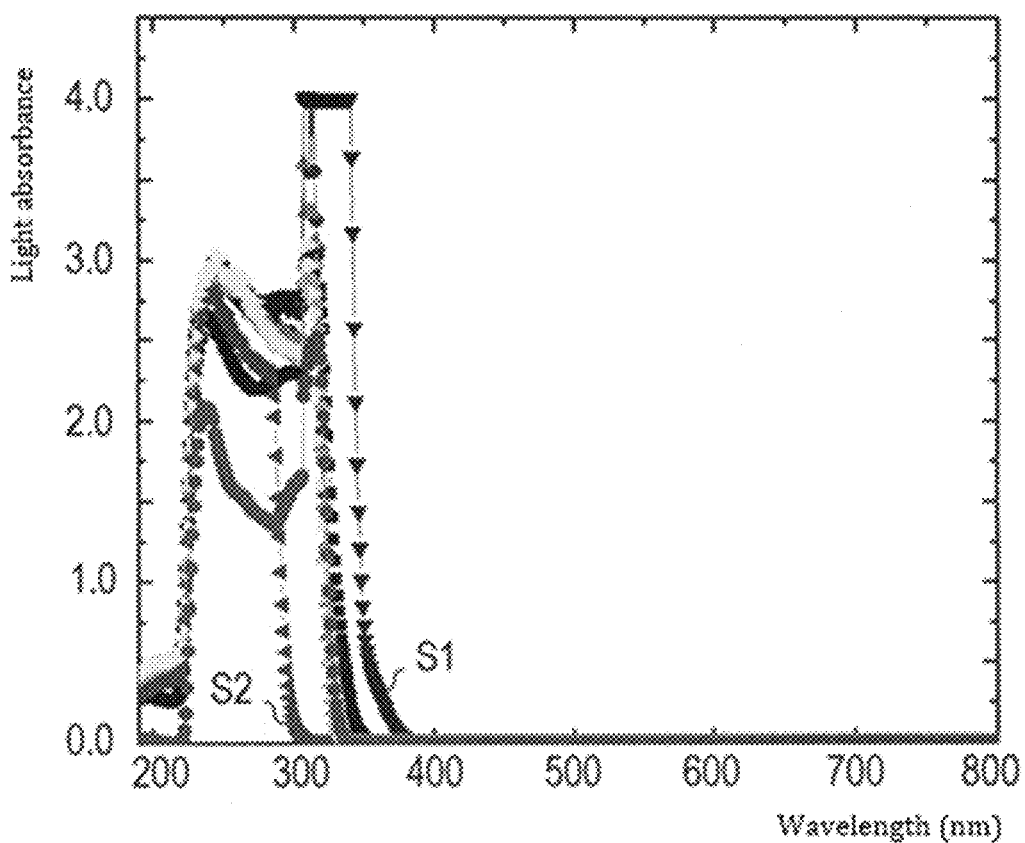
FIG. 3 shows a graph illustrating light absorption spectra of diphenylacetylene and non-diphenylacetylene liquid crystals.

FIG. 3 illustrates light absorption spectra of a diphenylacetylene liquid crystal that includes a diphenylacetylene polymer material and a non-diphenylacetylene liquid crystal that does not include a diphenylacetylene polymer material. In FIG. 3, the spectrum labeled as S1 is the light absorption spectrum of the diphenylacetylene liquid crystal and the spectrum labeled as S2 is the light absorption spectrum of the non-diphenylacetylene crystal.

As illustrated in FIG. 3, in the diphenylacetylene liquid crystal, the light absorbance increases at 400 nm or less, but in the non-diphenylacetylene liquid crystal, the light absorbance does not increase until about 300 nm. That is, when a 400 nm band is considered as a usage band of the spatial phase modulator 100, in a diphenylacetylene liquid crystal, which has an absorption edge near 400 nm, heat generation due to light absorption occurs more easily than in a non-diphenylacetylene liquid crystal, which has an absorption edge near 300 nm.

For these reasons, adopting a non-diphenylacetylene liquid-crystal layer that does not include a diphenylacetylene polymer material as the liquid-crystal layer 150 of the spatial phase modulator 100 enables a spatial phase modulator 100 with greater durability to be provided as a spatial phase modulator 100 for a laser-machining application.

Furthermore, when the usage band of the spatial phase modulator 100 is expanded or shifted from a wavelength band of 400 to 1,000 nm to an ultraviolet wavelength band, the composing material of the cover glass layer 120 may be changed from sapphire to quartz.

Figure 4:
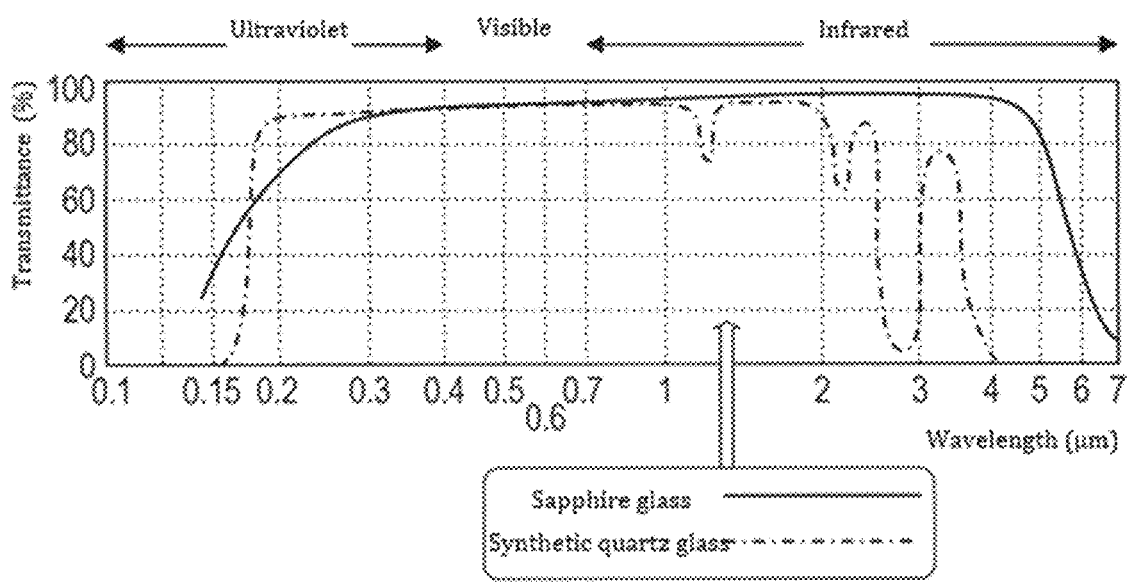
FIG. 4 shows a graph illustrating transmittances of a plurality of cover-glass materials.

As illustrated in FIG. 4, although sapphire exhibits high transparency from a visible range to an infrared range, the transparency of sapphire decreases in an ultraviolet range. Meanwhile, quartz exhibits higher transparency in the ultraviolet range than sapphire. This can be seen by comparing the transmittance of sapphire and the transmittance of synthetic quartz in the ultraviolet range illustrated in FIG. 4. In FIG. 4, the transmittance of sapphire is illustrated by the solid line and the transmittance of synthetic quartz is illustrated by the dashed line.

Changing the composing material of the cover glass layer 120 of the spatial phase modulator 100 from sapphire to quartz enables a spatial phase modulator 100 with excellent durability in the ultraviolet region to be configured. However, the thermal conductivity of quartz is lower than sapphire and is about 1 W/mK. Therefore, the composing material of the cover glass layer 120 may be selected from among sapphire and quartz according to the usage band of the spatial phase modulator 100.

Furthermore, the spatial phase modulator 100 may be provided with a thermal buffer layer 210, for suppressing thermal transmission from the transparent electrode layer 130 to the liquid-crystal layer 150, between the transparent electrode layer 130 and the liquid-crystal layer 150.

Figure 5:
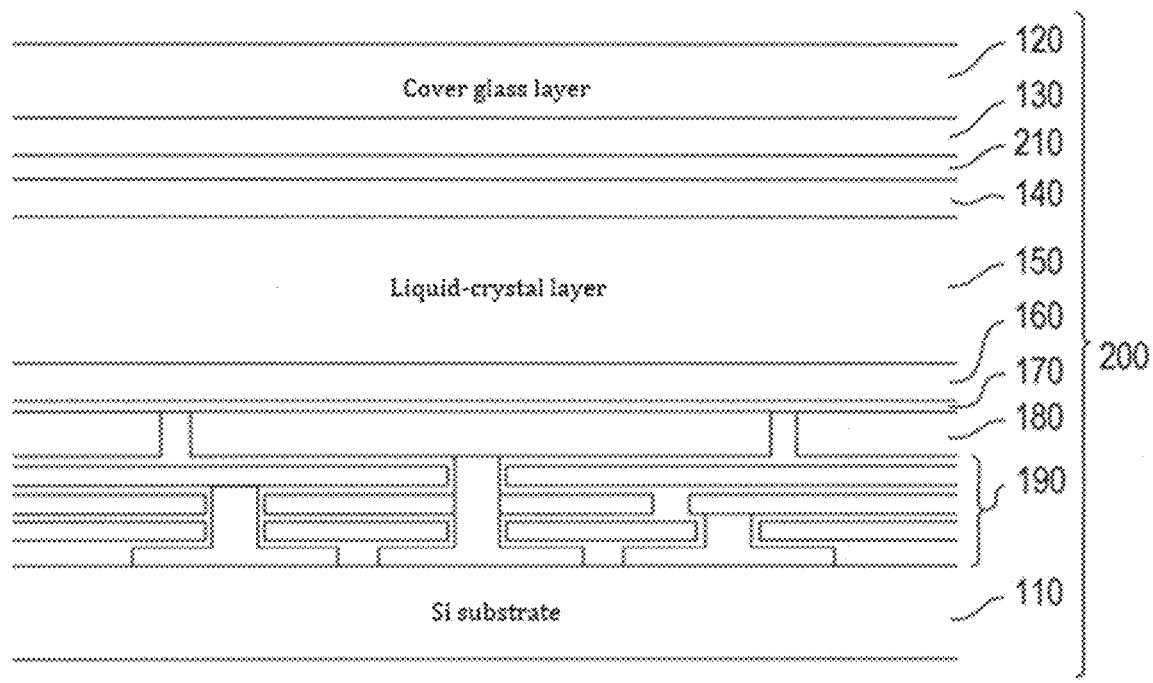
FIG. 5 shows a sectional view representing a configuration of a spatial phase modulator according to one or more embodiments of a first variation of the present invention.

FIG. 5 illustrates a spatial phase modulator 200 of a first variation provided with the thermal buffer layer 210. The spatial phase modulator 200 of the first variation is configured identically to the spatial phase modulator 100 above other than being provided with the thermal buffer layer 210.

Because the first oriented film layer 140 needs to be adjacent to the liquid-crystal layer 150, the thermal buffer layer 210 is specifically provided between the transparent electrode layer 130 and the first oriented film layer 140. The thermal buffer layer 210 is constituted of an optical thin film that is transparent with regard to the input light and absorbs little of the input light.

For example, the thermal buffer layer 210 is composed of an inorganic material such as $SiO_2$, $TiO_2$, $Ta_2O_5$, or $MgF_2$. Alternatively, the thermal buffer layer 210 is configured as a multilayer structure of these inorganic materials. However, the material of the thermal buffer 210 is not limited to the listed materials as long as it is a material that can suppress thermal transmission to the liquid-crystal layer 150.

Figure 6:
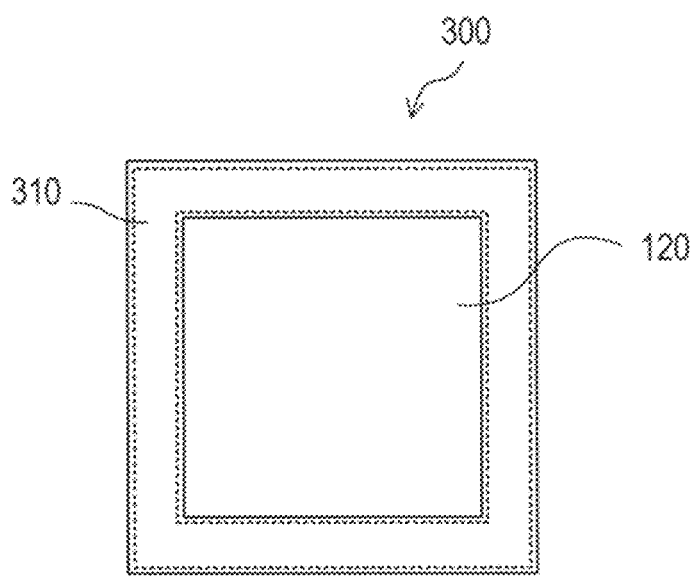
FIG. 6 shows a plan view representing a configuration of a spatial phase modulator according to one or more embodiments of a second variation of the present invention.

As another variation, a cooling structure 310 for cooling the interior may be provided on a surface of the spatial phase modulators 100 and 200. The cooling structure 310 can be metal fins. FIG. 6 illustrates a spatial phase modulator 300 of a second variation provided with the cooling structure 310.

The spatial phase modulator 300 of the second variation is provided with metal fins as the cooling structure 310 around an active region that is an upper face of the spatial phase modulator 300, this active region being provided with the cover glass layer 120, having the pulsed light input thereto, and being a region wherein phase modulation is possible. The region surrounded by the dashed line in FIG. 6 corresponds to the region of the cooling structure 310. The spatial phase modulator 300 of the second variation can have the same configuration as any among those of the spatial phase modulators 100 and 200 above other than being provided with the cooling structure 310.

According to the second variation, the cooling structure 310 enables temperature escalation of the spatial phase modulator 300 to be suppressed more effectively. However, examples of the cooling structure 310 are not limited to metal fins. The cooling structure 310 may be provided on a lower face of the spatial phase modulator 300 instead of the upper face thereof.

Illustrative embodiments of the present disclosure, including variations, are described above. However, the present invention is not limited to the illustrative embodiments above, and various embodiments can be adopted. For example, the spatial phase modulator of the present invention can be used in various fields other than laser machining.

A function had by one component in the above embodiment may be provided dispersed among a plurality of components. Functions had by a plurality of components may be integrated into one component. A portion of the configuration of the above embodiment may be omitted. At least a portion of the configuration of the above embodiment may be added to or substituted by another configuration of the above embodiment. All aspects included in the technical idea specified from the wording of the claims are embodiments of the present disclosure. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . laser machining system, 11 . . . light source, 13 . . . beam magnifying lens, 15 . . . projection device, 17 . . . controller, 19 . . . imaging lens, 100 . . . spatial phase modulator, 110 . . . silicon substrate, 120 . . . cover glass layer, 130 . . . transparent electrode layer, 140 . . . first oriented film layer, 150 . . . liquid-crystal layer, 160 . . . second oriented film layer, 170 . . . reflective layer, 180 . . . lower electrode layer, 190 . . . circuit layer, 200 . . . spatial phase modulator, 210 . . . thermal buffer layer, 300 . . . spatial phase modulator, 310 . . . cooling structure.

What is claimed is:

1. A liquid-crystal spatial phase modulator, comprising:
   a liquid-crystal layer;
   a transparent electrode layer disposed above the liquid-crystal layer, wherein light from above passes through the transparent electrode layer;
   a lower electrode layer disposed below the liquid-crystal layer;
   a non-metal reflective layer disposed above the lower electrode layer and below the liquid-crystal layer, wherein the non-metal reflective layer has a multilayer structure of an inorganic material;
   a first heat-resistant layer that has higher thermal resistance than the transparent electrode layer and is disposed above and adjacent to the transparent electrode layer; and
   a second heat-resistant layer that has higher thermal resistance than the transparent electrode layer and is disposed between the transparent electrode layer and the liquid-crystal layer and adjacent to the transparent electrode layer.

2. The spatial phase modulator according to claim 1, wherein the first heat resistant layer and the second heat-resistant layer are inorganic-material layers.

3. The spatial phase modulator according to claim 1, wherein
   the transparent electrode layer is an indium tin oxide (ITO) transparent electrode layer, and
   the first heat-resistant layer and the second heat-resistant layer have thermal resistance up to a temperature over 600 degrees Celsius.

4. The spatial phase modulator according to claim 1, wherein the first heat-resistant layer is a cover glass layer of sapphire or quartz.

5. The spatial phase modulator according to claim 1, wherein the second heat-resistant layer is an inorganic oriented film layer of silicon oxide (SiOX).

6. The spatial phase modulator according to claim 1, further comprising:
   an oriented film layer disposed above the liquid-crystal layer, wherein
   the second heat-resistant layer is a thermal buffer layer disposed above the oriented film layer and that suppresses thermal transmission from the transparent electrode layer to the liquid-crystal layer.

7. The spatial phase modulator according to claim 1, wherein the liquid-crystal layer does not contain a diphenylacetylene polymer material.

8. The spatial phase modulator according to claim 1, further comprising: a cooling structure that cools an interior and is disposed on a surface of the spatial phase modulator.

9. The liquid-crystal spatial phase modulator according to claim 1, wherein the non-metal reflective layer is disposed adjacently above the lower electrode layer and adjacently below the liquid-crystal layer.

10. A liquid-crystal spatial phase modulator, comprising:
    a cover glass layer;
    a transparent electrode layer disposed below the cover glass layer;
    a first oriented film layer disposed below the transparent electrode layer;
    a liquid-crystal layer disposed below the first oriented film layer;
    a second oriented film layer disposed below the liquid-crystal layer; and
    a lower electrode layer disposed below the second oriented film layer; and a non-metal reflective layer disposed between the second oriented film layer and the lower electrode layer, wherein the non-metal reflective layer has a multilayer structure of an inorganic material, the transparent electrode layer is an indium tin oxide (ITO) transparent electrode layer, the cover glass layer is a glass layer of sapphire or quartz, and the first oriented film layer and the second oriented film layer are inorganic oriented film layers of silicon oxide (SiOX).

11. The spatial phase modulator according claim 10, further comprising:

a thermal buffer layer that suppresses thermal transmission from the transparent electrode layer to the liquid-crystal layer and is disposed between the transparent electrode layer and the first oriented film layer.

12. The liquid-crystal spatial phase modulator according to claim 10, wherein the non-metal reflective layer is disposed adjacently between the second oriented film layer and the lower electrode layer.

* * * * *